UNITED STATES PATENT OFFICE.

JUDSON A. DE CEW, OF NEW YORK, N. Y.

METHOD OF MAKING EMULSIONS.

1,347,734.  Specification of Letters Patent.  Patented July 27, 1920.

No Drawing. Application filed December 30, 1918. Serial No. 268,965.

*To all whom it may concern:*

Be it known that I, JUDSON A. DE CEW, a subject of the King of Great Britain, and resident of the city of New York, in the State of New York and United States of America, have invented certain new and useful Improvements in Methods of Making Emulsions, of which the following is a full, clear, and exact description.

This invention relates to a process for making emulsions, emulsoids or colloidal solutions from any kind of oily or waxy material and involves the introduction of the use of pressure and critical temperatures as a means of effecting the desired state of emulsification or solution.

In order to make clear the new principles in this invention I will describe the present methods of making emulsions or dilute solutions of oils in an aqueous medium.

It is possible to blend an oil either mineral or vegetable with certain materials which are soluble in water; for instance sulfonated oil will mix with water and will also mix with a water insoluble oil. If therefore, it is first intimately blended with the oil and then it is stirred into an aqueous medium, the sulfonated oil or water-soluble product will leave its association with the water insoluble oil and become dissolved in the water for which it has greater affinity. In this process of going into solution the sulfonated oil casts off or leaves behind the water insoluble oil in the form of small particles which act to produce an emulsion of the oil in the aqueous solution.

Another method by which emulsions are made in the arts is to blend a soap with the mineral or water insoluble oil, for it is known that a saponified oil or fat will, under suitable conditions of concentration in aqueous solution and at suitable temperature, blend with these water insoluble oils. The affinity with which these materials are held together is very slight however, even when they are properly blended, so that such conditions as boiling, freezing and dilution with water will cause them to separate again into oil and soap. When an oil therefore, in which soap has been dissolved is added to water or an aqueous solution, the soap will depart from its association with the oil and become dissolved in the water owing to its greater affinity for the latter and this leaves the water insoluble oil in the form of an emulsion in the aqueous medium.

The third method of making aqueous emulsions with a mineral oil, is to blend with the mineral oil an oily product which is saponifiable and then introduce this mixture into an alkaline aqueous solution, the alkali being either potash or soda. In this case the saponifiable oil leaves its association with the mineral oil and unites with the alkali to form a soap, which soap dissolves in the aqueous solution and the mineral oil is left in the form of floating or emulsified particles thus producing an aqueous emulsion consisting of mineral oil and a soap solution.

The ultimate result in this case is the same as if the soap had first been produced from a saponifiable oil and then blended under suitable conditions with the mineral oil.

The process which is the basis of my discovery is the means of improving the quality of emulsions or solutions produced by any of the above methods, by introducing the use of pressure and temperature control so as to obtain emulsions either finer in character and having greater stability or even to obtain colloidal solutions in which the water insoluble oil is retained in solution in the water soluble material even after it has been brought to a dilute state.

The three chemical means of making oil emulsions already described are always brought about by means of hand mixing and no definite mechanical methods of effecting a more perfect dilution without that decomposition which produces emulsions has yet been introduced into the arts.

Emulsifying compounds which are partially soluble in water are used for lubrication in machine shop practice and they are also used in textile trades and in the tanning industry. The quality or fineness of emulsions produced is entirely dependent upon the emulsifying compound which is introduced into the oils.

I have discovered that if these compounds are diluted with water under pressure and at a temperature of approximately 180° Fahrenheit that the entire compound may be diluted with little or no decomposition resulting from the solvent action of the aqueous material. I can carry out this process with various kinds of injecting, atomizing or emulsifying apparatus, but I prefer to use an aparatus similar to that described in my patent applications Nos. 195,607 or 235,138. The materials to be diluted may be first placed under pressure and then forced through fine apertures into the aqueous material at the right temperature or the material may be drawn by suction into an injecting apparatus which forces it under pressure into contact with the aqueous solvent at the right temperature. After solution has taken place at this critical temperature which is approximately 180° Fahrenheit, the solution or emulsion is then discharged, still under pressure, into cold water where it is further diluted and where it is stabilized by being reduced to a temperature at which the emulsified particles do not unite with each other.

The mechanical operation will be practically the same whether the water-soluble and water insoluble materials are previously blended or whether the emulsifying or solvent action is produced under pressure within the emulsifying apparatus by bringing a partially saponifiable product into contact with a hot alkaline solution instead of a hot neutral solution.

A specific example of my process is as follows: 80 parts of any mineral oil, 10 parts of a soap and 10 parts of sulfonated oil are mixed in a small tank and heated to 180° F. in which temperature the materials blend together or are dissolved in each other. The blended mixture is then put through an atomizing device, the water at 180° F., so that the critical temperature is maintained until the solution is effected. The hot solution is then cooled by any suitable means, such as injecting it into water at a lower temperature.

The results obtained by my invention are, practically speaking, as follows:—

The solvent power of the aqueous medium is discovered to be at its maximum at approximately 180° Fahrenheit and by using pressure properly applied for subdividing the material to be dissolved into fine streams or films, a practically instantaneous action is obtained on the compound so that the water insoluble material is not separated entirely from the solvent with which it has been blended, but it is carried into a state of solution in the diluted solvent, thus effecting a physical condition relating to emulsoid or colloid material.

I have demonstrated in actual practice that the finer state of dispersion of the emulsified particles, the greater will be the efficiency in value of this emulsion for industrial purposes. I have also discovered that when a water insoluble material like mineral oil, can be brought into a state of colloidal solution in a diluted aqueous solution of soap or sulfonated oil, that its maximum value as a lubricant has been developed. Such a state can only be brought about by employing the methods described in this invention. The more specific operations are as follows:—The two different materials, namely the emulsifying compound and the aqueous solution, are heated in such a manner that when they are brought together in this soap mixing or emulsifying apparatus, they will have an average temperature of approximately—180° Fahrenheit. Either air pressure, steam pressure or hydraulic pressure may be the means employed for forcing these materials into combination, but the pressure must be sufficient and the design of the apparatus must be such as to give an intimate and violent mixing action at the temperature above described so that immediate solution is effected of the most of the compound. The fact is that a well compounded mixture will remain compounded even in a dilute solution when the solution is effected in the manner described.

Having brought about a state of solution without decomposition, the diluted mixture is further stabilized by chilling as quickly as possible by mixing immediately with a cold aqueous solution. Emulsions can be produced in a similar manner using oils which are completely saponifiable, and an alkaline solution, but in this case the amount of alkali must be limited to that which will but partially saponify the oil, so that the final product will be finely divided oil, emulsoid in character, existing in a medium of dilute soap solution.

Having thus described my invention, what I claim is;—

1. A method of making emulsions or emulsoids, which consists in forcing an emulsifiable compound into contact with an aqueous solution, the materials being mixed violently, under pressure, with any emulsifying apparatus at a temperature of approximately 180° Fahrenheit, and then discharging the emulsions or emulsoid formed into an aqueous solution having a lower temperature.

2. A method of making emulsions or emulsoids, which consists in bringing an emulsifiable compound into contact with an aqueous solution, under pressure, within an atomizing device, where the two liquids are intimately mixed by agitation at a temperature of approximately 180° Fahrenheit, after which the solution or emulsion produced is further diluted with an aqueous solution having a lower temperature.

3. A method of making emulsions or emulsoids which consists in bringing an oil containing saponifiable material into contact with an alkaline aqueous solution, under pressure, within an atomizing device, whereby violent agitation at a temperature of approximately 180° Fahrenheit emulsions or solutions are produced, then stabilizing the emulsions by diluting them with water or an aqueous solution having a lower temperature.

4. A method of making emulsions from a saponifiable oil, which consists in bringing the oil into contact with an alkaline aqueous solution, under pressure, within an atomizing device, where they are mixed by agitation at a temperature of approximately 180° Fahrenheit and where the amount of alkali is insufficient to produce complete saponification of the oil, then cooling the emulsion by mixing with water at a lower temperature.

In witness whereof I have hereunto set my hand.

JUDSON A. DE CEW.